United States Patent [19]
Gautier et al.

[11] Patent Number: 5,588,349
[45] Date of Patent: Dec. 31, 1996

[54] SERVO WITH ENHANCED SAFETY

[75] Inventors: Jean-Pierre Gautier; Ulysse Verbo, both of Aulnay-Sous-Bois; Maurice Gebauer, Sevran, all of France

[73] Assignee: AlliedSignal Europe Services Techniques, Drancy, France

[21] Appl. No.: 379,464

[22] PCT Filed: Jan. 10, 1995

[86] PCT No.: PCT/FR95/00029

§ 371 Date: Jan. 30, 1995

§ 102(e) Date: Jan. 30, 1995

[87] PCT Pub. No.: WO95/21083

PCT Pub. Date: Aug. 10, 1995

[30] Foreign Application Priority Data

Feb. 4, 1994 [FR] France .................... 94 01250

[51] Int. Cl.[6] ................ F01B 11/02; F15B 9/10
[52] U.S. Cl. .................. 92/169.3; 91/376 R
[58] Field of Search .................. 91/369.1, 376 R; 92/169.3, 169.4

[56] References Cited

U.S. PATENT DOCUMENTS 4,256,016  3/1981  Thomas .................. 91/376 R
5,447,030  9/1995  Wang et al. ............... 92/169.3 X

FOREIGN PATENT DOCUMENTS

| 0298871 | 1/1989 | European Pat. Off. ........... 91/376 R |
| 0331535 | 9/1989 | European Pat. Off. . |
| 0524033 | 1/1993 | European Pat. Off. . |
| 4209648 | 9/1993 | Germany . |
| 0004663 | 1/1983 | Japan ..................... 92/169.3 |
| 0114151 | 7/1984 | Japan ..................... 9/376 R |

*Primary Examiner*—Hoang Nguyen
*Attorney, Agent, or Firm*—Leo H. McCormick, Jr.

[57] ABSTRACT

A pneumatic servo for brake boosting intended for motor vehicles. The servo having a rigid casing divided into at least two chambers by a flexible membrane. The casing being composed of at least first and second elements and having at least two tie rods for joining the first and second elements together in an inward axial direction. The tie rods respond to any force which tends to move the first and second elements apart. At least one of the tie rods is compressible should an external force be applied to move the first element toward the second element to prevent communication of the external force through the second element into an operator compartment.

5 Claims, 3 Drawing Sheets

SERVO WITH ENHANCED SAFETY

The present invention relates to a pneumatic servo for brake boosting intended for motor vehicles, comprising a rigid casing divided into at least two chambers by means of a flexible membrane, the casing being composed of at least two elements and this servo comprising at least two tie rods joining the two elements together in an axial direction, in order to exert, between these elements, a reaction in response to any force which tends to move them apart.

Servos of this type are known in the prior art, and an example thereof is given in Patent EP-B-0,331,535.

The invention offered lies in the discovery that servos with tie rods, although offering the advantage of displaying very satisfactory rigidity for a relatively low weight, also exhibit the drawback of being able to transmit very substantial loads to the driver in the event of an accidental frontal impact on the vehicle, and the object of the invention consists precisely in reconciling the advantages and the drawbacks of this type of servo.

To this end, the servo of the invention is essentially characterized in that at least one of the tie rods is compressible in the axial direction.

For example, the compressible tie rod essentially comprises at least two tubes slipped into one another in order to constitute a telescopic tie rod.

According to another possible embodiment, the compressible tie rod can essentially be made up of a flexible cable.

Other characteristics and advantages of the invention will emerge clearly from the description thereof which is given hereafter, by way of non-limiting indication, with reference to the appended drawings in which.

Figure 1:
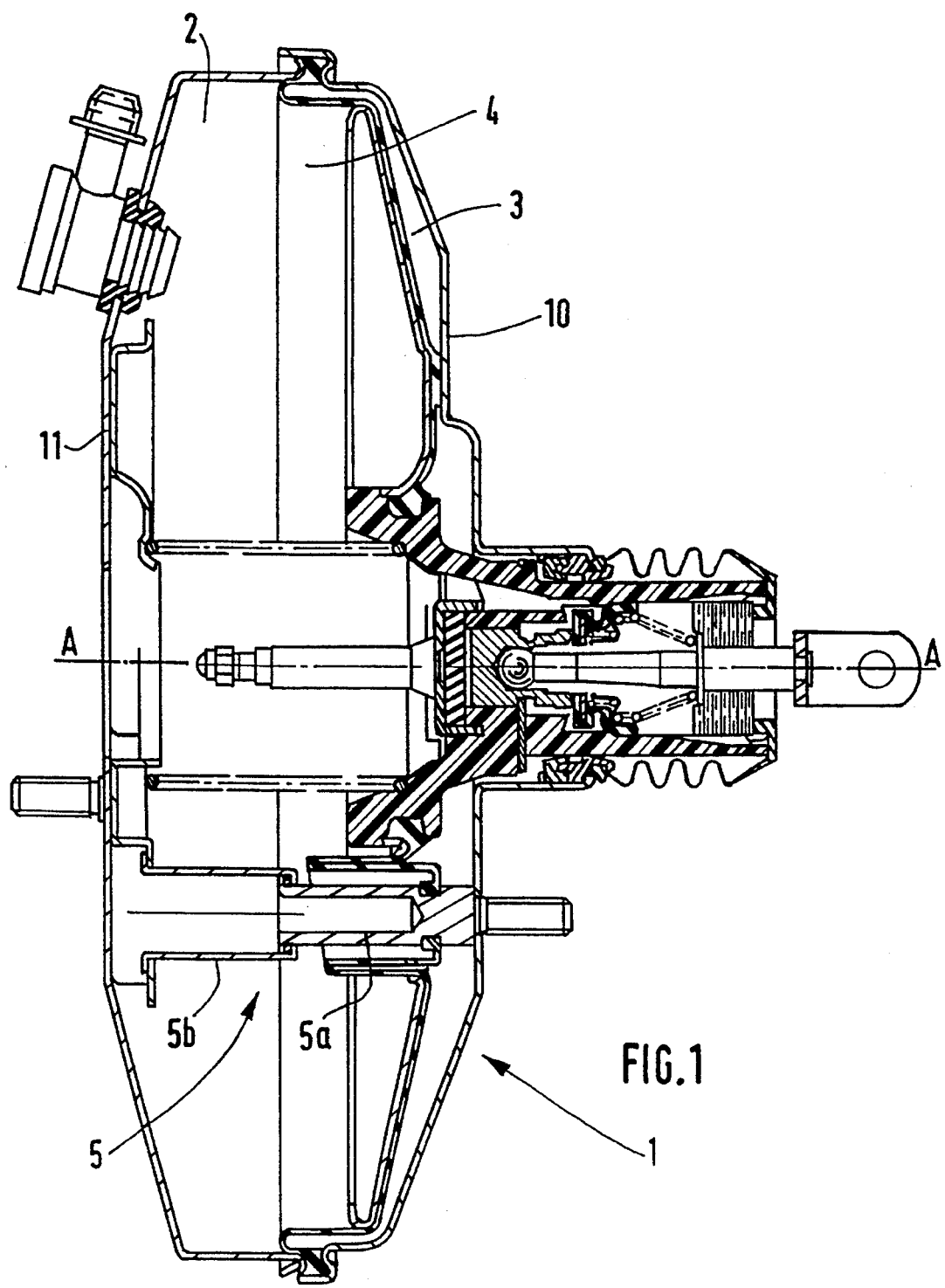
FIG. 1 is a view in partial section of a servo in accordance with a first embodiment of the invention.

As FIG. 1 shows, the invention relates to a pneumatic servo for brake boosting, intended for motor vehicles and comprising a rigid casing 1 divided into at least two chambers 2, 3 by means of a flexible membrane 4.

The casing is composed of at least two elements 10, 11 crimped to one another and joined together by at least two tie rods such as 5, the latter being orientated in an axial direction A and designed to oppose any load which, in operation, tends to move the elements 10 and 11 of the casing apart.

According to the invention, at least one of the tie rods is compressible in the axial direction A, i.e. its two ends can easily be approached one another by a movement of at least one end along this direction.

Figure 2:
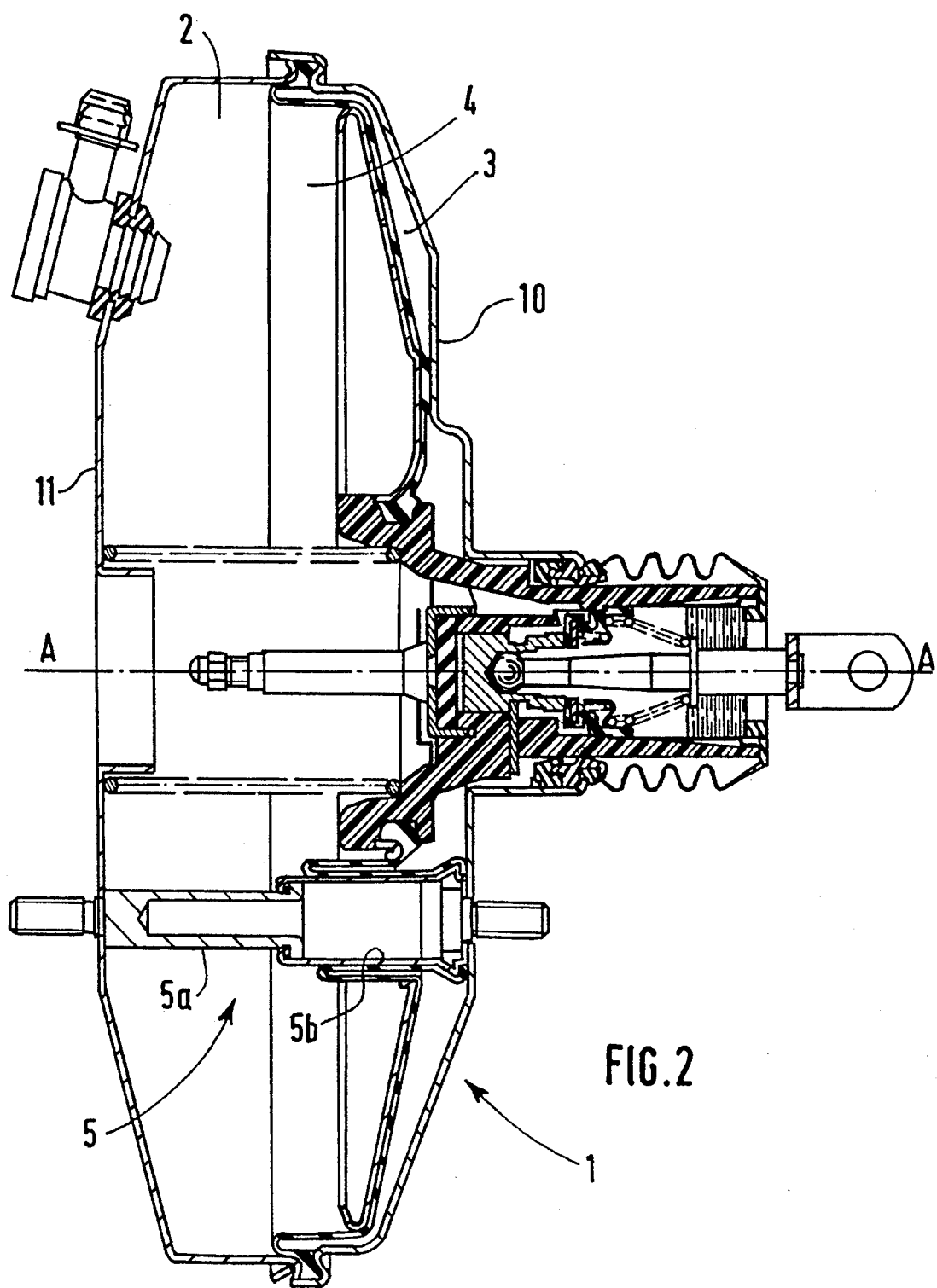
FIG. 2 is a view in partial section of a servo in accordance with a variant of the first embodiment of the invention.

As FIGS. 1 and 2 show, each compressible tie rod, such as 5, may assume the form of a telescopic tie rod and comprise at least two tubes 5a, 5b slipped into one another, the inner tube 5a being capable, in the event of impact, of retracting by sliding inside the outer tube 5b.

Figure 3:
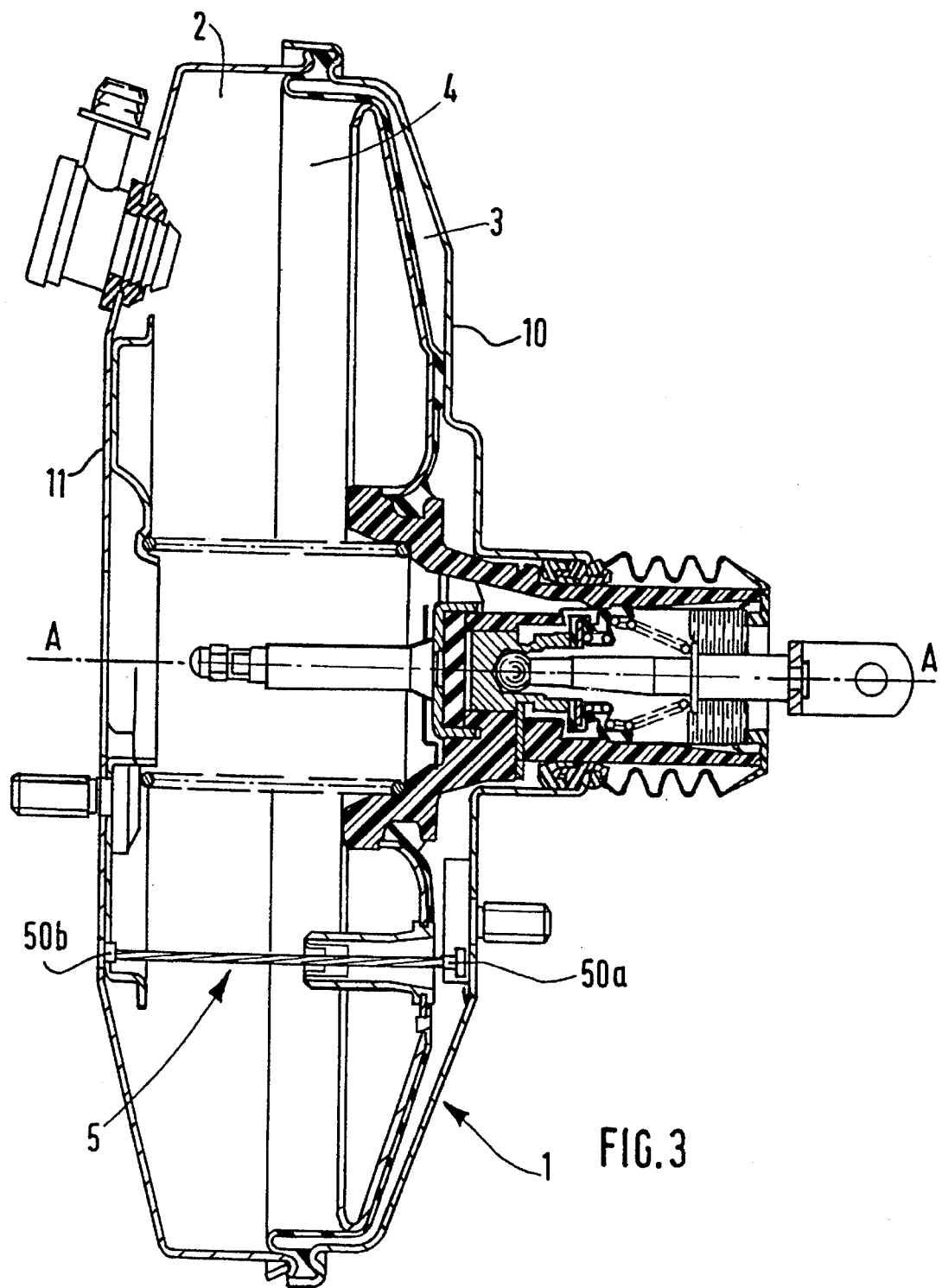
FIG. 3 is a view in partial section of a servo in accordance with a second possible embodiment of the invention.

However, each compressible tie rod may also, as FIG. 3 shows, be made up of a flexible cable crimped at both its ends 50a, 50b to the elements 10 and 11 of the casing.

We claim:

1. A pneumatic servo for brake boosting intended for motor vehicles having a rigid casing defined by first and second shells, said first and second shell being divided into at least two chambers by means of a flexible membrane, said first and second shells being joined together by at least first and second tie rods to define a sealed casing, said first and second tie rods being reacting to any force which tends to move said first and second shell apart, said first and second tie rods each being characterized by a cable which joins said first shell to said second shell together in an axial direction to maintain said sealed casing while being compressible to allow an external impact force applied to said first shell to dissipated without being transferred into said second shell.

2. A pneumatic servo for brake boosting intended for motor vehicles, comprising a rigid casing divided into at least two chambers by means of a flexible membrane, said casing being composed of at least first and second elements and having at least two tie rods for joining said first and second elements together in an inward axial direction, in order to exert, between said elements, a reaction in response to any force which tends to move said first and second elements apart, characterized in that at least one of the tie rods is compressible in said inward axial direction whenever an external force is applied to move said first element toward said second element to reduce the communication of said external force through said second element into an operator compartment.

3. The servo according to claim 2, characterized in that said compressible tie rod essentially comprises at least two tubes slipped into one another in order to constitute a telescopic tie rod.

4. The servo according to claim 2, characterized in that said compressible tie rod is essentially made up of a cable.

5. A pneumatic servo for brake boosting intended for motor vehicles having a rigid casing defined by first and second shells, said first and second shell being divided into at least two chambers by means of a flexible membrane, said first and second shells being joined together by at least first and second tie rods to define a sealed casing, said first and second tie rods being reacting to any force which tends to move said first and second shell apart, said first and second tie rods each being characterized by a first tube which telescopes into a second tube, said first tube engaging said second tube to hold said first shell in axial engagement with said second shell to maintain said sealed casing while being compressible to allow an external impact force applied to said first shell to dissipated without being transferred into said second shell.

* * * * *